United States Patent [19]

Janos et al.

[11] Patent Number: 4,687,617
[45] Date of Patent: Aug. 18, 1987

[54] STEADY-STATE INDUCTIVE SPHEROMAK OPERATION

[75] Inventors: Alan C. Janos, E. Windsor; Stephen C. Jardin, Princeton; Masaaki Yamada, Lawrenceville, all of N.J.

[73] Assignee: The United States of America as represented by the United States Department of Energy, Washington, D.C.

[21] Appl. No.: 703,577

[22] Filed: Feb. 20, 1985

[51] Int. Cl.$^4$ .............................................. G21B 1/00
[52] U.S. Cl. ..................................... 376/137; 376/143
[58] Field of Search ........................ 376/137, 133, 143

[56] References Cited

U.S. PATENT DOCUMENTS 4,363,776  12/1982  Yamada et al. ..................... 376/133
4,436,691   3/1984  Jardin et al. ....................... 376/137

OTHER PUBLICATIONS

PPPL, "S-1 Spheromak Project", Engineering Handbook, Apr. 1981 Ed., pp. 15-19.
LA-8700-C, 12/80, pp. 76, 77.
Physics Today, 3/75, pp. 17, 20.

Primary Examiner—Harvey E. Behrend
Attorney, Agent, or Firm—Jeannette M. Walder; Gustavo Siller, Jr.; Judson R. Hightower

[57] ABSTRACT

The inductively formed spheromak plasma can be maintained in a highly stable and controlled fashion. Steady-state operation is obtained by forming the plasma in the linked mode, then oscillating the poloidal and toroidal fields such that they have different phases. Preferably, the poloidal and magnetic fields are 90° out of phase.

10 Claims, 19 Drawing Figures

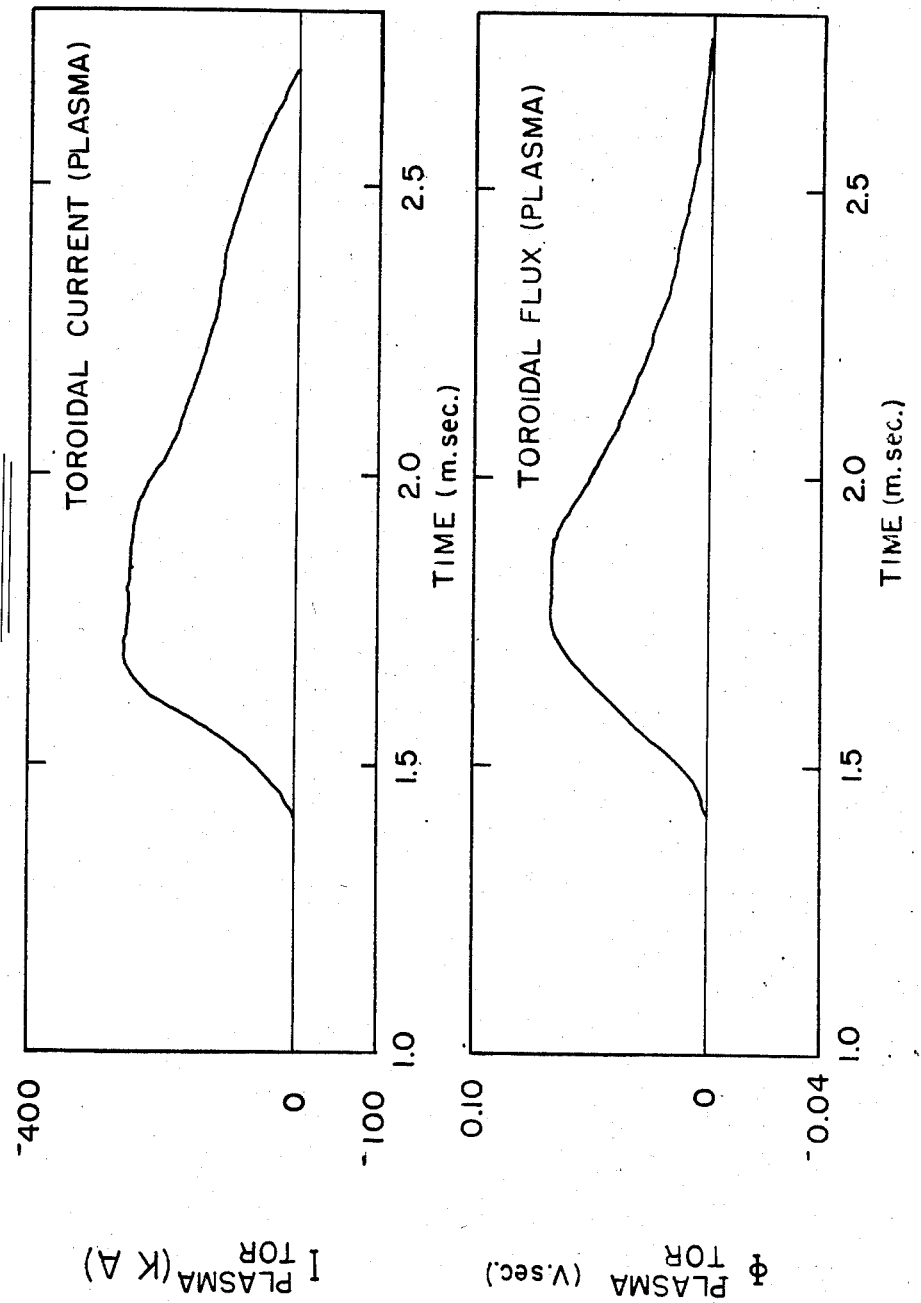

SPHEROMAK PLASMA FORMING

SPHEROMAK PLASMA PINCHED-OFF $I_{TF}$ NOW UNCOUPLED, SO CAN REDUCE CURRENT TO ZERO

RECONNECTED

FIG. 4e
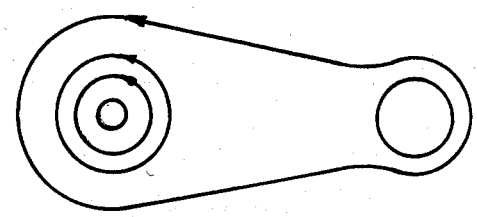
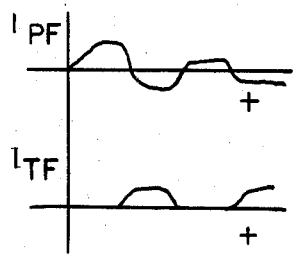
INJECT MORE TOROIDAL FLUX
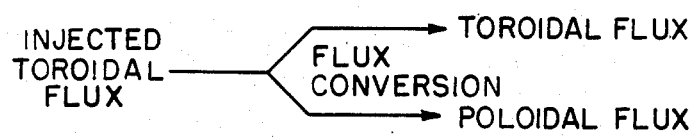
INJECTED TOROIDAL FLUX → FLUX CONVERSION → TOROIDAL FLUX / POLOIDAL FLUX
FIG. 4f
REPEAT STEPS C THRU E.

THE SPHEROMAK DEVICE.

POLOIDAL CIRCUIT

TOROIDAL CIRCUIT

STEADY-STATE INDUCTIVE SPHEROMAK OPERATION

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

This invention relates to the confinement of plasmas by magnetic fields and, more particularly, to a steady-state inductive method for maintaining inductively formed spheromak plasmas.

The spheromak is a compact torus with internal toroidal field and nonlinked coil structure. This topology allows for a simply connected first wall and blanket easing engineering requirements and adding flexibility to reactor concepts by permitting translation and compression. Its very low aspect ratio makes possible a compact high power density reactor core. Its high current density minimizes the need for auxiliary heating. The high ratio of internal to external currents leads to a high engineering beta value, $\beta$ E, potentially allowing a magnet system using copper coils or pumped liquid metal blanket.

The basic method and apparatus for inductively forming a spheromak plasma is described in U.S. Pat. No. 4,363,776, which is incorporated herein by reference. In accordance with this patent and as shown in FIG. 5, a spheromak plasma is formed by energizing the external equilibrium field coils 5 to produce a first poloidal magnetic field; energizing the poloidal coil in the flux core 2 to produce a second poloidal magnetic field, thereby producing a composite poloidal field which has regions of stronger and weaker strength; energizing the toroidal coil of the flux core to initiate a plasma discharge and to cause toroidal flux to appear outside of the flux core; expanding the plasma in the direction of the region of weaker poloidal magnetic field strength; and pinching off a portion of the expanded plasma by energizing the pinching coils 4 to produce a detached spheromak plasma. U.S. Pat. No. 4,436,691, which is also incorporated herein by reference, is an improvement to the foregoing patent in that it discloses a more efficient means for detaching the spheromak plasma from the flux core and eliminates the need for pinch coils: the directions of the currents in the poloidal field and the toroidal field generating coils are reversed simultaneously such that a resultant normal component $V_n$ of plasma velocity away from the flux core is approximately zero. $V_n$ is determined from the equation: $V_n = E_p B_t - E_t B_p$ where $E_t$ and $B_p$ are the electric and magnetic fields, respectively, produced by the poloidal field generating coil, and where $B_t$ and $E_p$ are the magnetic and electric fields, respectively, produced by the toroidal field generating coil.

While the foregoing inductive method of forming a spheromak plasma offers improvements over other spheromak non-inductive formation methods, the inductive method has not been suitable for continuous or steady-state operation. Inductively produced spheromak plasmas are subject to resistive decay and heretofore the poloidal field and toroidal field have not been able to be maintained, as both are produced (in part or in whole respectively) by plasma currents. The inductive method has been used only in a pulsed operation; i.e. the method must be reproduced at regular intervals.

Steady-state or long-pulse operation of any fusion reactor has many advantages over pulsed operation. Some of these advantages include lower energy, more energy efficiency, less fatigue due to thermal stresses of pulsed operation, and constant power output. The possibility for steady-state operation of spheromaks has relied so far on one of a number of unproven schemes: radio frequency current drive, beam injection, or merging of newly created spheromaks with previously established, but decaying, ones. Steady-state spheromak drive has been proposed by use of electrodes, as well.

Since steady-stae operation is a significant goal in the attainment of a commercial fusion reactor, it is an object of the present invention to provide a steady-state inductive method of maintaining a spheromak plasma.

Additional objects, advantages, and novel features of the invention will be set forth in part in the description which follows, and in part will become apparent to those skilled in the art upon examination of the following or may be learned by practice of the invention.

SUMMARY OF THE INVENTION

The inductively formed spheromak configuration (S-1) can be maintained in a highly stable and controlled fashion. The method described below eliminates the restriction to pulsed spheromak plasmas or the use of electrodes for steady-state operation, and, therefore, is a reactor-relevant formation and sustainment method.

Steady-state inductive operation is possible because of recent discoveries by the inventors: flux conversion and relaxation phenomena have been discovered in the S-1 spheromak plasma and favorable stability of the linked-mode (in which the plasma is not completely detached from the core so that some poloidal magnetic flux links both the plasma and the core) has been demonstrated.

To achieve the foregoing and other objects and in accordance with the purposes of the present invention, a steady-state method of maintaining an inductively formed spheromak plasma may comprise the steps of: (a) inductively forming a spheromak plasma by: evacuating a vacuum vessel and filling said vessel with a neutral species; producing a first poloidal magnetic field within said vacuum vessel; producing a second poloidal magnetic field within said vacuum vessel by pulsing a current $I_{PF}$ in a first direction through a poloidal field generating coil located in a toroidally shaped flux core within said vacuum vessel, such that first and second poloidal magnetic fields are superimposed to form a composite poloidal magnetic field $\psi$ within said vacuum vessel having regions of stronger and weaker strength; producing a toroidal magnetic field $\phi$ in said vacuum vessel by passing a current $I_{TF}$ through a toroidal field generating coil located in the flux core, thereby initiating a plasma discharge and causing toroidal flux to appear outside of the flux core; expanding the plasma in the direction of said region of weaker poloidal magnetic field strength; (b) partially pinching off a portion of said expanded plasma, thereby producing a line-linked spheromak plasma which is partially connected to the core; and (c) oscillating the poloidal and toroidal magnetic fields $\psi$ and $\phi$ such that $\psi$ and $\phi$ have different phases. The plasma may be partially pinched off by either energizing a set of pinching coils or by simultaneously reversing the directions of $I_{TF}$ and $I_{PF}$.

BRIEF DESCRIPTION OF THE DRAWINGS

The present invention is illustrated in the accompanying drawings wherein.

as a function of time.

FIG. 2c shows resulting experimentally measured plasma toroidal current and flux for this discharge.

Figure 3A:
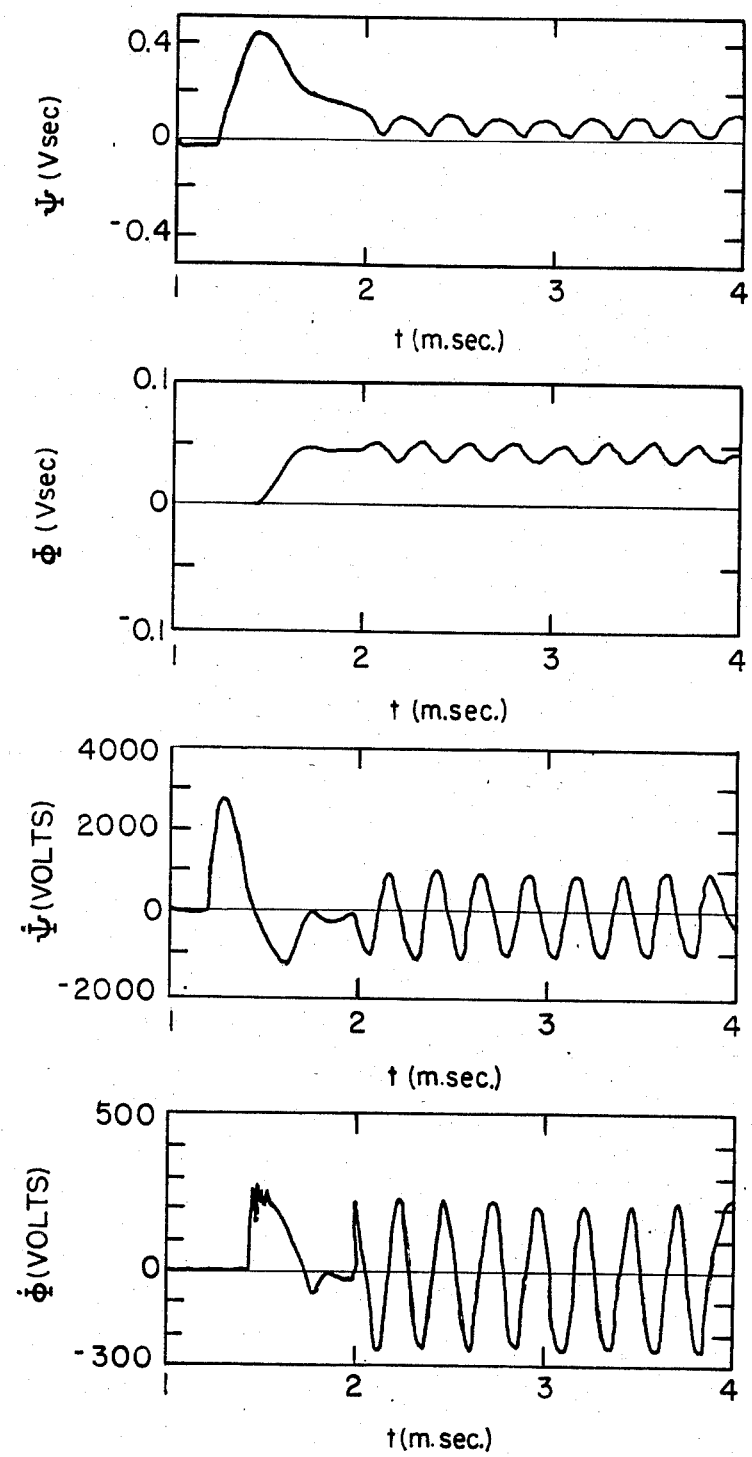

FIG. 3a—Time histories of fluxes and voltages for the same inductively formed spheromak as above, but a simulated oscillation of poloidal and toroidal fluxes is initiated at time 0.6 msec into the discharge in order to supply helicity continuously.

Figure 3B:
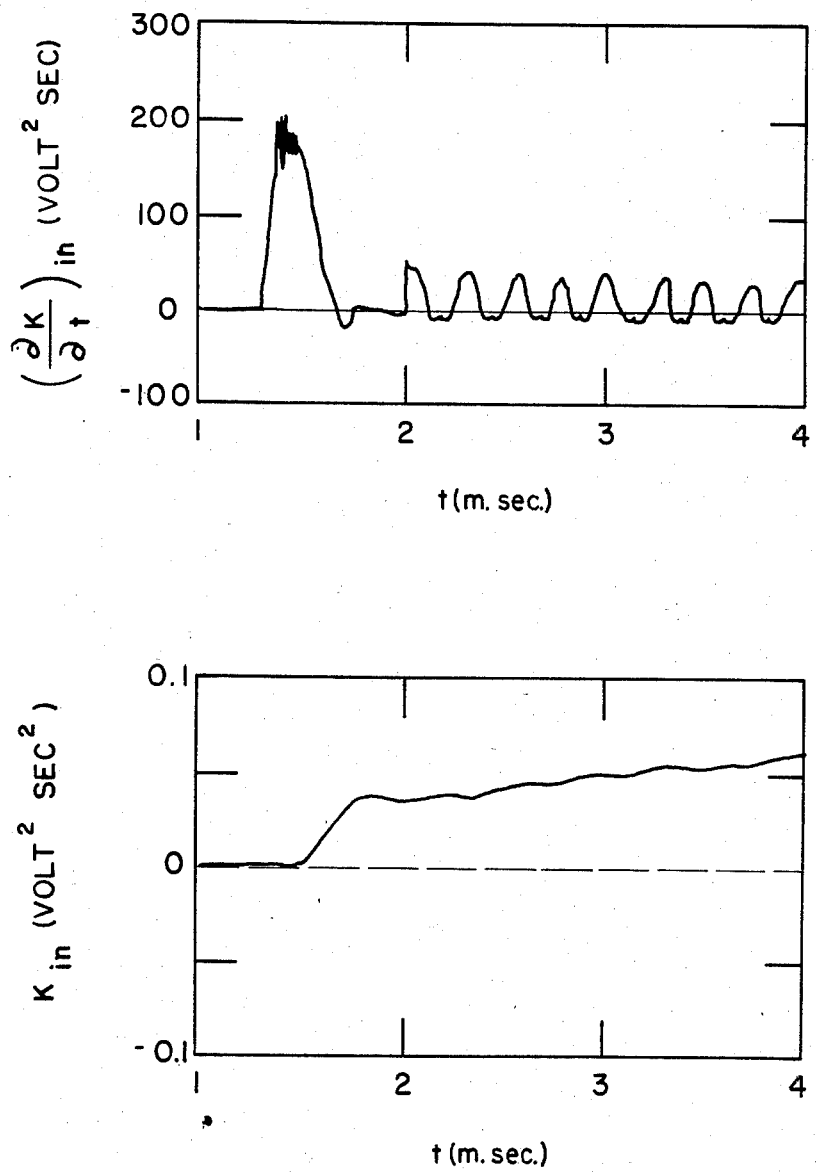

FIG. 3b shows the helicity input rate and resulting net input helicity for $\psi - \phi$ pumping. Note that the helicity input doubles in about 4.5 msec with pumping.

FIGS. 4a-4f show time sequences of the alternate quasi-steady state method in which the detached plasma is formed first and then reconnected.

Figure 5:
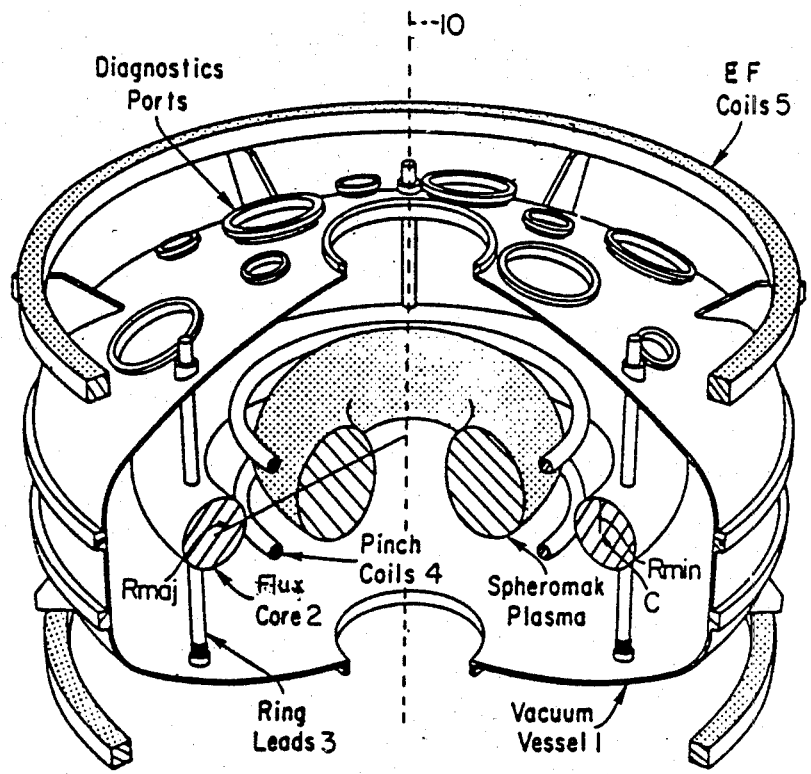

FIG. 5 is a cut-away perspective of the spheromak device.

Figure 6:
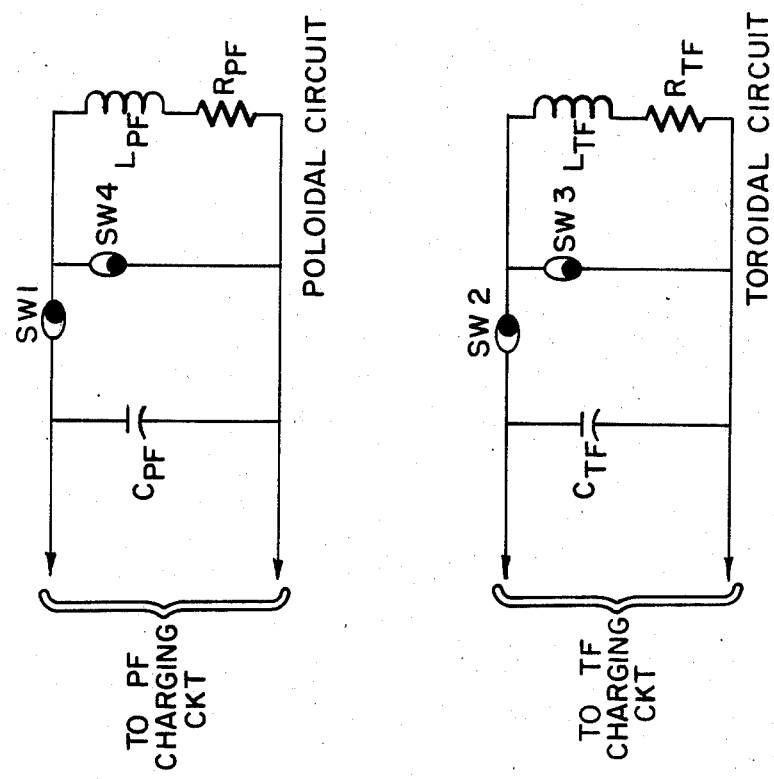

FIG. 6 shows typical pulsed circuits for inductively forming a spheromak plasma.

Figure 7:
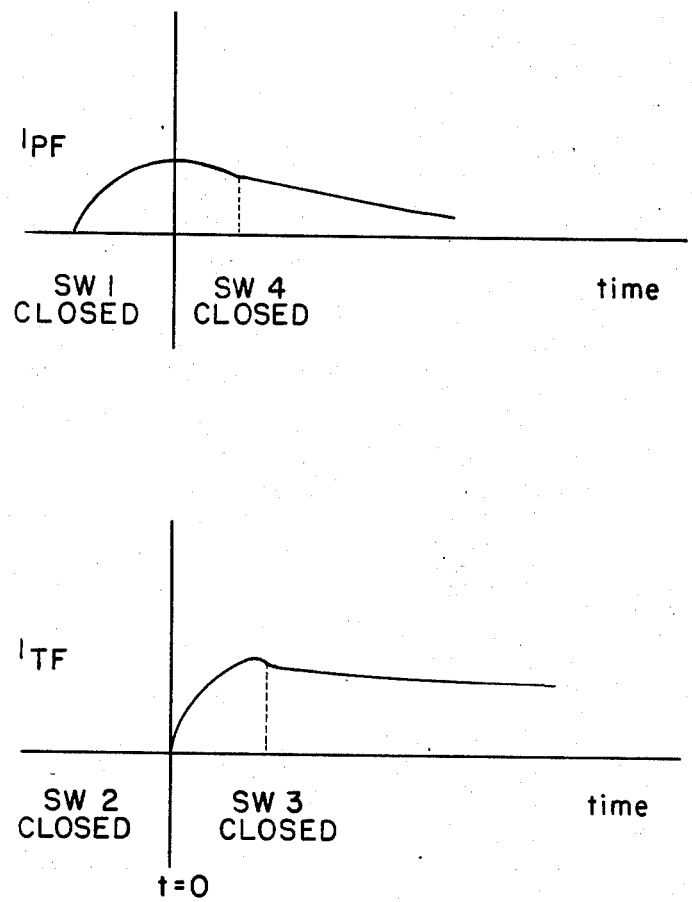

FIG. 7 shows the timing sequence for a linked spheromak discharge formation using the circuitry of FIG. 6.

Figure 8:
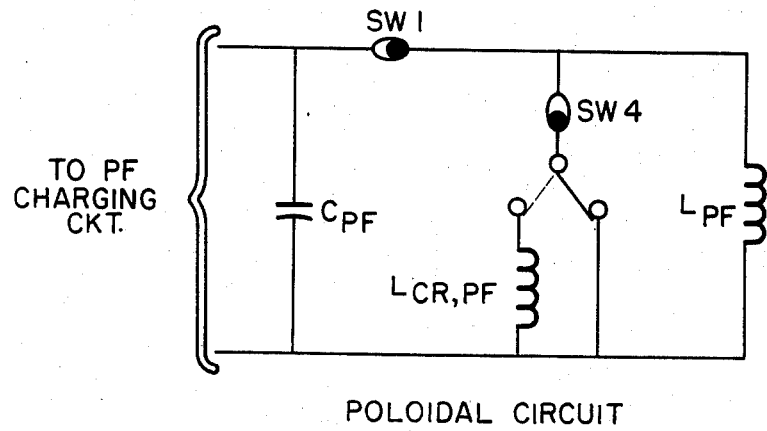
Figure 8:
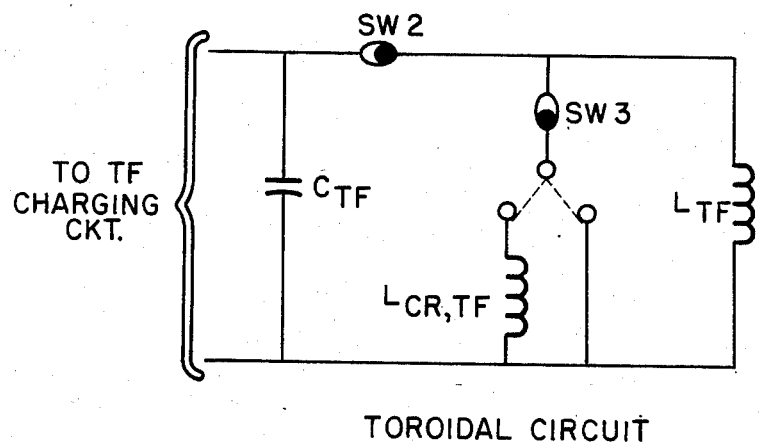

FIG. 8 shows the modification to the circuitry of FIG. 6 necessary to provide $\psi - \phi$ pumping.

Figure 9:
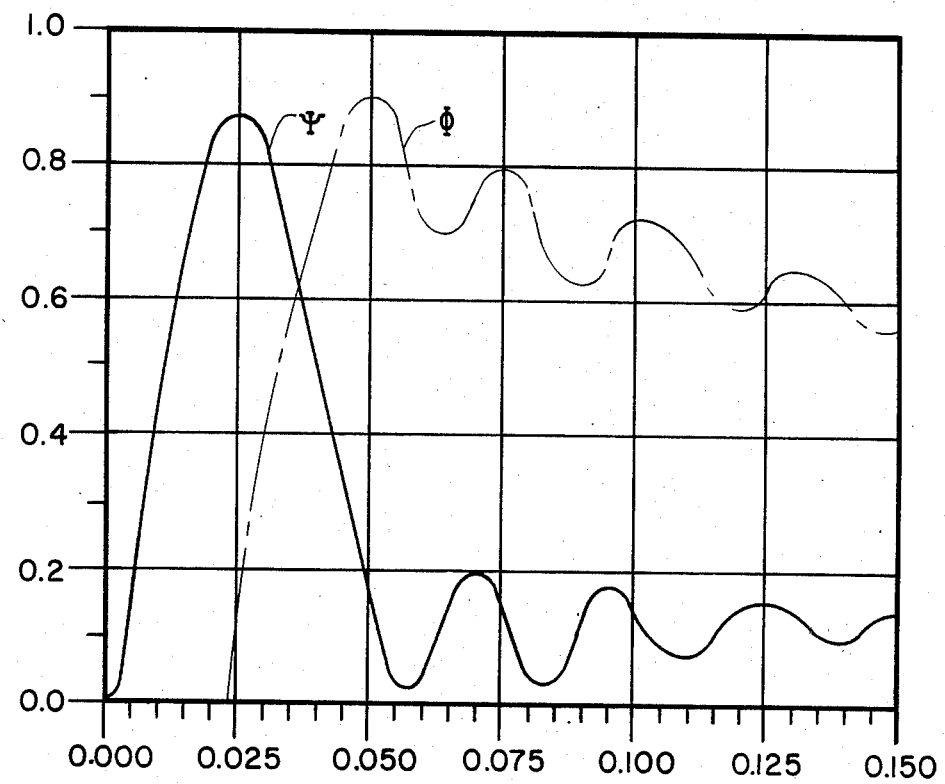

FIG. 9 shows the oscillations of $\psi$ and $\phi$ with the resistive decay corresponding to operation with the circuitry of FIG. 8.

Figure 10:
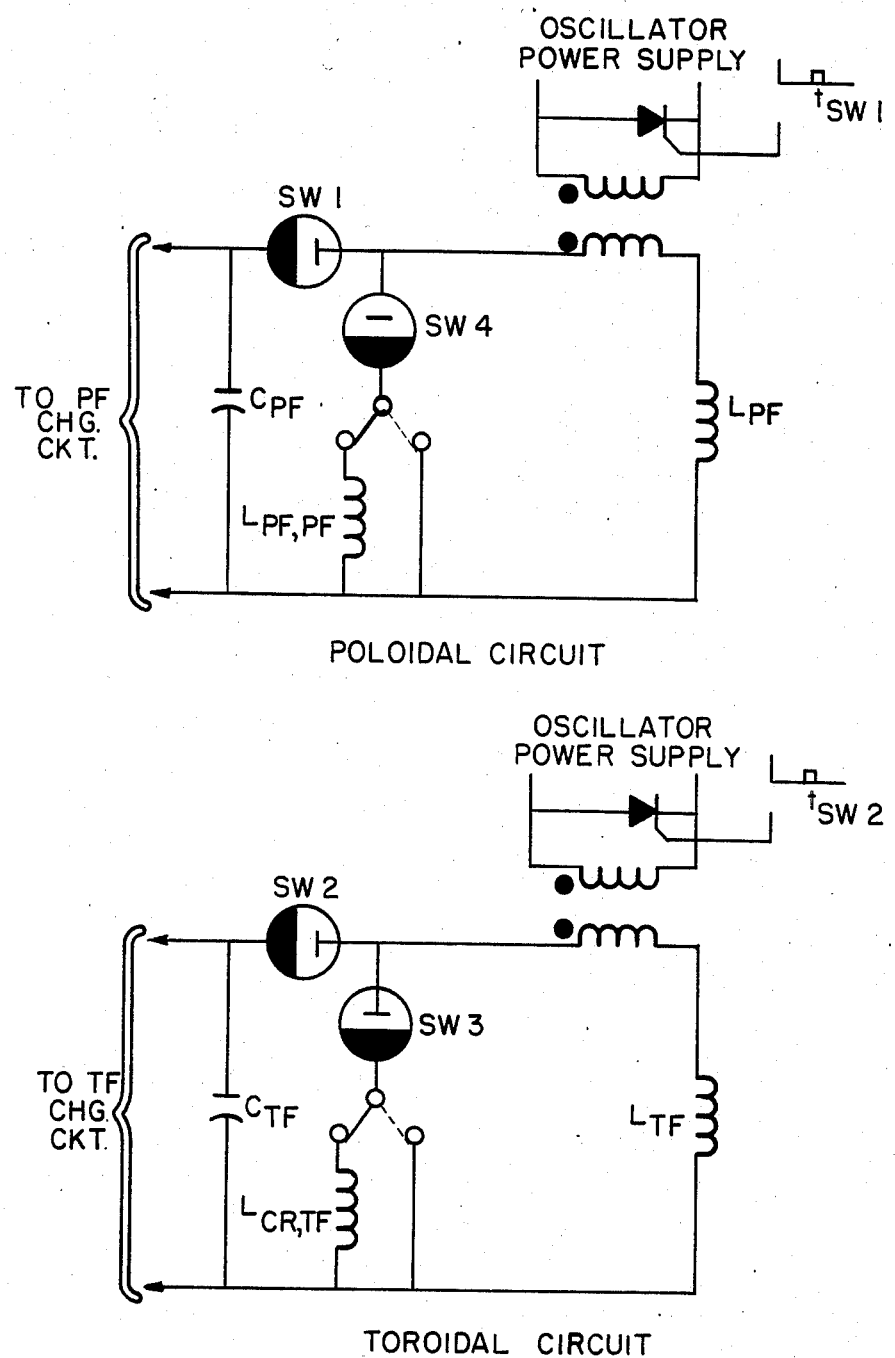

FIG. 10 shows a modification to the circuit of FIG. 8.

Figure 11:
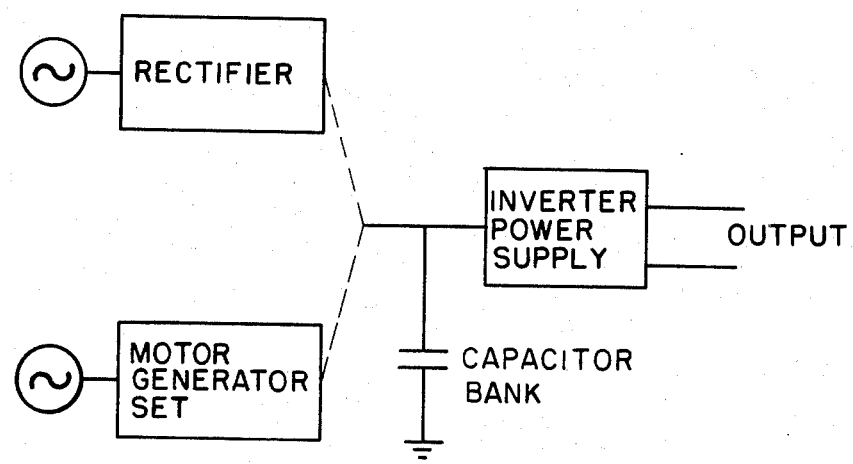
Figure 11:
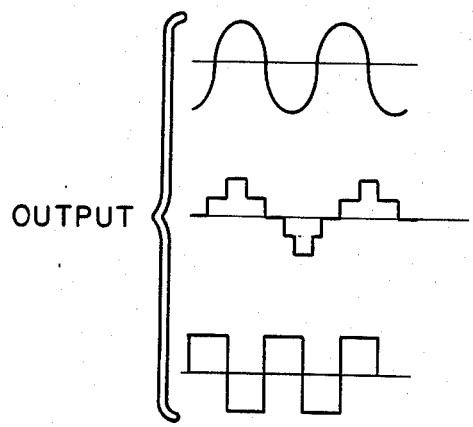

FIG. 11 shows the input to each inverter.

DETAILED DESCRIPTION OF THE INVENTION

As noted above, steady-state operation is possible due to the demonstration of flux conversion and relaxation phenomena. These phenomena have been demonstrated in the following ways.

First, spheromak plasmas have been found to contain significantly more toroidal flux than in the flux core. This unbalance develops during the second half of the spheromak formation period. A simple circuit model of inductive coupling cannot account for this enhancement. Major-radius compression of the plasma from the core radius to the final equilibrium radium cannot explain it either, since toroidal flux would be expected to be conserved at best. This flux gain has been identified to be a result of flux-conversion processes. Poloidal flux has been converted into toroidal flux during formation. The poloidal field constitutes a much greater reservoir of flux than does the toroidal field.

Second, spheromak plasmas aggressively seek a state characterized by a constant ratio of the plasma toroidal current I (poloidal flux) to plasma toroidal flux $\phi$, independent of initial conditions. This I/$\phi$ ratio is a global $\lambda$ value, where $\lambda$ is defined by the force-free condition $j = \lambda B$. It is proportional to the pinch parameter $\theta \equiv 2I/aB_o$ of RFP (Reverse Field Pinch) research through a simple geometric factor involving the plasma size. The I/$\phi$ values agree with the classical spheromak model, which is a minimum-energy state. The approach to this state is accomplished either in an unobtrusive, quiet, and continuous manner during formation or in an abrupt relaxation-oscillation fashion.

Third, distinct relaxations events occurs if I/$\phi$ deviates too far from well-defined limits. Either the I/$\phi$ ratio abruptly drops back to an acceptable range between these limits or the plasma quickly terminates. These events are usually preceded by current and flux sinusoidal oscillations of well-defined frequency and growth rate and are reminiscent of Taylor's minimum-energy helical state.

Fourth, both the toroidal plasma current and flux vary with the applied poloidal- and toroidal-field bank voltages. Poloidal and toroidal-field circuits in the flux core were driven in an attempt to force the spheromak plasma, during formation, away from its optimum configuration. The plasma took whatever helicity was input from the power systems and adjusted its fluxes (and currents) appropriately. Flux conversion was conclusively and directly identified as having maintained the proper flux distribution between the poloidal and toroidal circuits so that a constant I/$\phi$ was maintained. Conversion of poloidal to toroidal and toroidal to poloidal fluxes has been positively identified in S-1 Spheromak plasmas.

Fifth, there are high-frequency fluctuations on the current time derivative during the reconnection phase. Frequencies are on the order of 100 to 200 kHz. These fluctuations may be due to plasma interaction with the core liner or to turbulence necessary for adjustment to a Taylor state.

Figure 1:
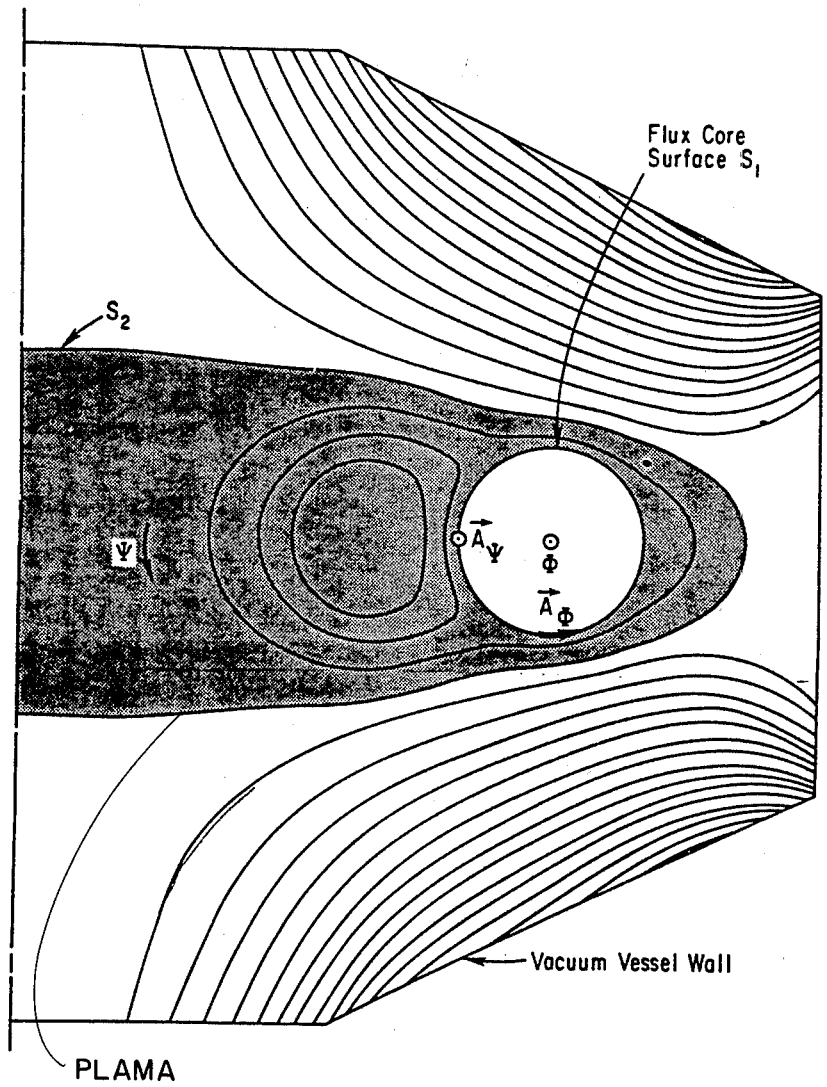
FIG. 1 shows a schematic of the cross-section of the S-1 device, including vacuum vessel, flux core, and a linked discharge in which flux surfaces of an inductively formed spheromak plasma are not completely detached from the flux core. The shaded portion indicates the plasma volume.

The steady-state method of the present invention injects magnetic helicity from the flux core into the already formed spheromak configuration by appropriately oscillating the currents in the poloidal- and toroidal-field circuits (FIG. 3a). This method requires the spheromak to be operated in the linked mode; that is, the spheromak would be formed in the same manner as usual, but would not be completely detached from the core to wit, some plasma magnetic flux links both the plasma and the core (a linked spheromak plasma is shown in FIG. 1). Hereafter, an oscillation of both poloidal- and toroidal-field currents in the core commences. A net helicity is injected from the core into the plasma on an average over a period of oscillation. The phasing is chosen to maximize the average helicity input rate. This $\psi - \phi$ pumping works because of the nonlinear behavior of the magnetics.

This pumping technique has two immediate advantages over some of the other pulsed techniques: the injection is continuous and controllable; and it operates in the stable linked mode. Without a stabilizing system or method, plasmas either tilt or shift after completely detaching, depending on the equilibrium field shape. Increased stability against tilting and shifting has been demonstrated by not fully detaching the spheromak from the core. The linked mode provides both a very stable plasma and the necessary coupling between the plasma and core.

It can be shown that the proper definition of the magnetic helicity for the linked spheromak topology is $$K \equiv \int A \cdot B \, dV - \psi\phi. \tag{1}$$

A is the vector potential; $B = \nabla \times A$ is the magnetic field vector. The integral is over the plasma volume. The magnetic fluxes $\psi$ and $\phi$ are defined by $$\psi = \int A \cdot dl_\phi \tag{2}$$

and $$\phi = \int A \cdot dl_\theta,$$

where the line integrals of the vector potential are taken the long and the short way around the flux core, respectively.

The plasma has the two surfaces $S_1$ and $S_2$ to consider in the linked mode, as is shown in FIG. 1. The surface $S_1$ between the plasma and the core can be considered a constant flux surface. This is experimentally true for several reasons. First, the flux core poloidal field system and the equilibrium field system are designed so that, at the moment the plasma is initiated, the vacuum poloidal flux intercepting the core surface is minimized. Second, there is an aluminum shell (not shown) with poloidal and toroidal cuts, embedded in the core between the surface and the coils; this smoothes field ripple and maintains a more nearly constant flux surface at the core surface throughout the discharge. Hence, $B \cdot dS = 0$ on $S_1$. The surface $S_2$ is defined by the outermost poloidal field line enclosing the plasma so that $B \cdot dS = 0$ identically.

The time dependence of K is obtained by taking the time derivative of Eq. (1):

$$\frac{\partial K}{\partial t} = \int \left[ \frac{\partial A}{\partial t} \cdot \underline{B} + \underline{A} \cdot \frac{\partial B}{\partial t} \right] dV + \tag{3}$$

$$\int [\underline{A} \cdot \underline{B}] \underline{v} \cdot dS - \frac{\partial}{\partial t} (\psi\phi).$$

Further analysis reduces equation (3) to $$\frac{\partial K}{\partial t} = -2 \int \underline{E} \cdot \underline{B} \, dV - 2\psi\dot\phi. \tag{4}$$

The second part of equation (4) is the helicity input term, which is rewritten $$\left( \frac{\partial K}{\partial t} \right)_{in} = 2\psi\dot\phi \tag{5}$$

where $\phi$ is now the experimentally measured toroidal flux inside the core and $\psi$ is now the experimentally measured poloidal flux between the device axis and the core surface. This sign convention is chosen to conform to that used to display the experimental data below and also to make the plasma helicity a nonnegative quantity.

Steady-state operation by injecting helicity involves oscillation of both circuits around some equilibrium values, with the proper phasing, so that the time average $<2\psi\dot\phi>t>0$.

Helicity input requires $$2\psi\dot\phi > 0. \tag{6}$$

Let the flux functions during the stead-state drive phase be $$\psi = \psi_0 + \psi_1 \cos \omega t$$

$$\phi = \phi_0 + \phi_1 \cos(\omega t + \delta), \tag{7}$$

where $\psi_0$, $\psi_1$, $\phi_0$, $\phi_1$, and $\omega$ are determined by the size and strength of the plasma and where $\delta$ is the angle of phase shift. Substitution of Eq (7) into Eq. (6) and averaging over time results in $$<2\psi\dot\phi t = -\omega\phi_1 \sin \delta; \tag{8}$$

This average is a maximum when $\sin \delta = -1$, or when $\delta = -\pi/2$. Then the maximum average helicity input rate is $$<\partial K/\partial t>_{in, max} = \omega\psi_1\phi_1. \tag{9}$$

The resulting flux functions during the steady-state drive phase are therefore $$\psi = \psi_0 + \psi_1 \cos \omega t$$

$$\phi = \phi_0 + \phi_1 \cos(\omega t - \pi/2). \tag{10}$$

Representative time histories of fluxes and voltages are shown in FIG. 3A. The maximum average helicity input rate relative to the peak-to-peak swing of the helicity input rate is $$\frac{<\delta K/\delta t>_{in,max}}{(\delta K/\delta t)_{p-p}} = \frac{1}{2} \frac{(\psi_1/\psi_0)^2}{(\psi_1/\psi_0)^2 + (\psi_1/\psi_0) + \frac{1}{4}} \tag{11}$$

and is increased when $\psi_1/\psi_0$ is increased. The ratio $\psi_1/\psi_0$ cannot be greater than one, otherwise the plasma is no longer coupled to the core during part of a cycle. Helicity input rate $(\partial k/\partial t)$ and resulting net input helicity $(K_{in})$ for the $\psi-\phi$ pumping of FIG. 3a is shown in FIG. 3b.

Higher pumping frequencies are better, but a limit is set by the skin time of the flux core liner. With higher frequencies, there is also a practical upper voltage limit for the power supplies and coil systems. Higher modulation in the toroidal flux is also better. The normalized helicity input rate $\dot K/K$ should be larger than the inverse classical diffusion time but smaller than the inverse relaxation time in order for the plasma to assimilate the input flux into a relaxed state before the configuration decays.

The present invention can also be used if the spheromak plasma is first detached. In this case, the detached spheromak plasma must be reconnected before the above described $\psi-\phi$ pumping can occur. $I_{TF}$ would first be reduced to zero so that the toroidal flux would be available for another cycle of the pumping. The reconnection is accomplished by increasing $I_{PF}$. See FIGS. 4c and 4d.

Figure 4A:
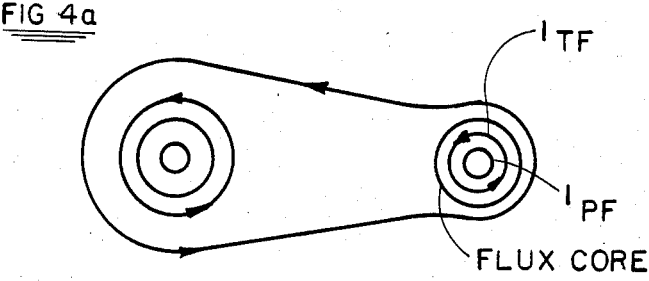
Figure 4A:
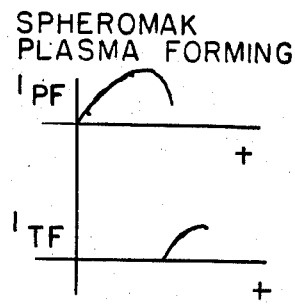
Figure 4B:
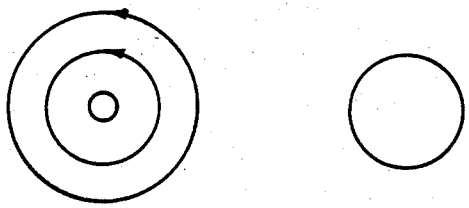
Figure 4B:
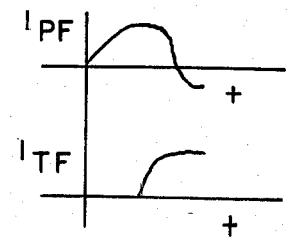
Figure 4C:
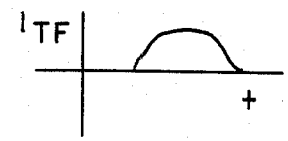
Figure 4D:
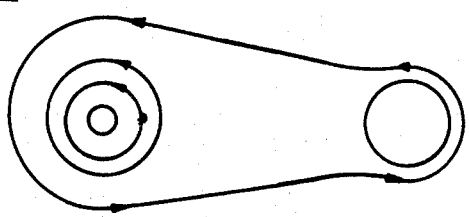
Figure 4D:
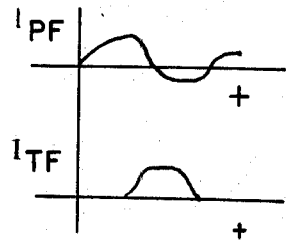

A quasi-steady-state method of operation can also be employed. FIGS. 4a and 4b show the basic spheromak formation of a detached plasma. FIGS. 4c and 4d show the timing sequences for recharging the toroidal flux coil and for reconnection, the formation of the linked plasma. FIG. 4e shows the timing sequence for maintaining the spheromak plasma through the input of only toroidal flux. This is accomplished by the phenomena of flux conversion: injected toroidal flux is converted to poloidal flux and toroidal flux. If $\psi-\phi$ pumping is not continued, the plasma will eventually decay and become detached. A quasi-steady-state operation can be accomplished by repeating the timing sequence of FIGS. 4c-4e: the plasma becomes detached, then reconnected, then pumped.

EXPERIMENTAL RESULTS

Figure 2A:
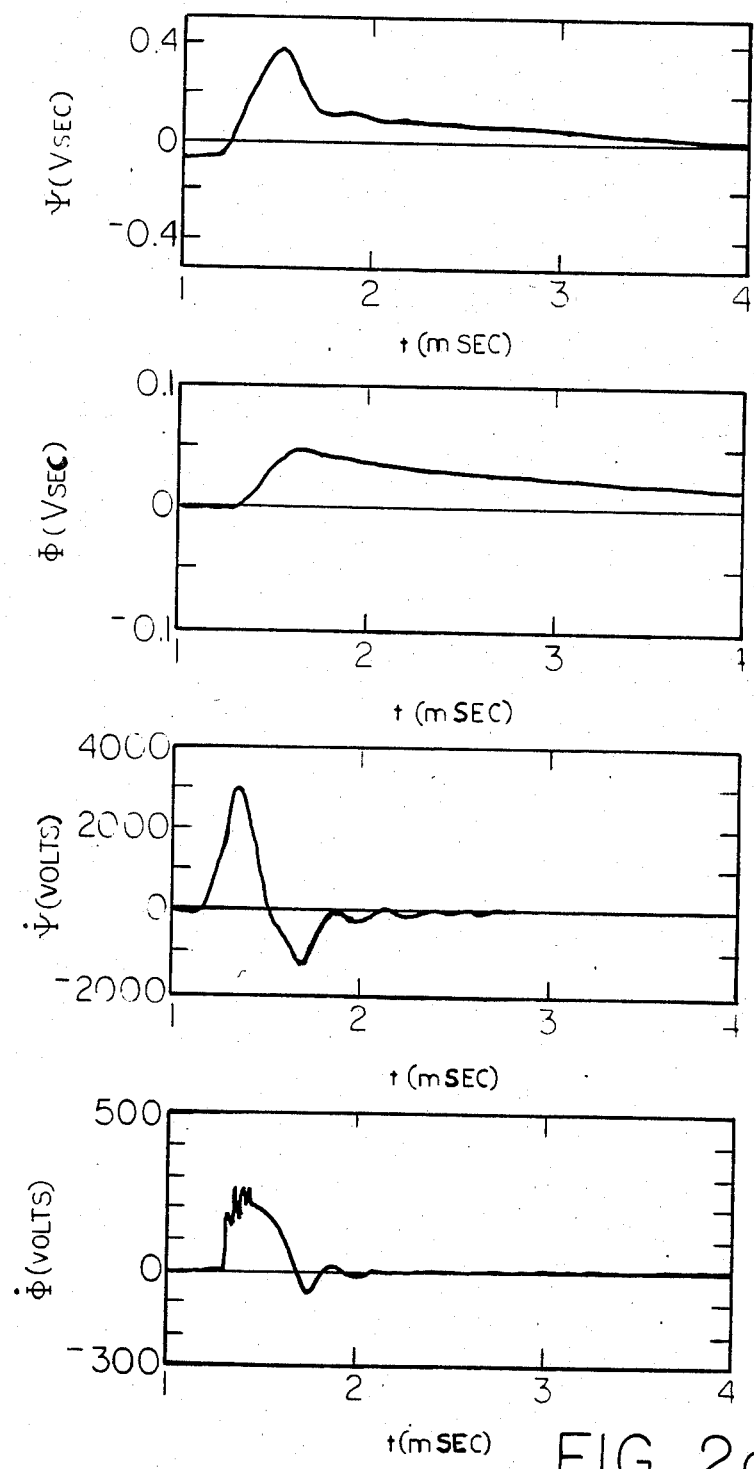
FIG. 2a shows experimentally measured time histories of fluxes and voltages for a typical, inductively formed spheromak in the linked mode. From top-to-bottom: the poloidal flux $\psi$ coupled by the flux core, the toroidal flux $\phi$ inside the flux core, the associated time derivatives of these fluxes.
Figure 2B:
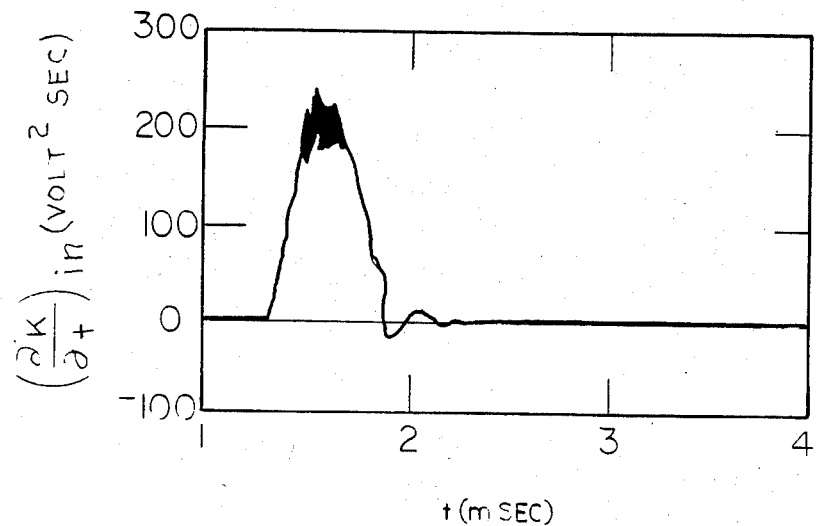
FIG. 2b shows the rate of helicity injection $(\partial K/\partial t)_{in} = 2\psi\dot{\phi}$ and the resulting net input helicity $$\int_0^t 2\psi\dot{\phi}dt$$
Figure 2B:
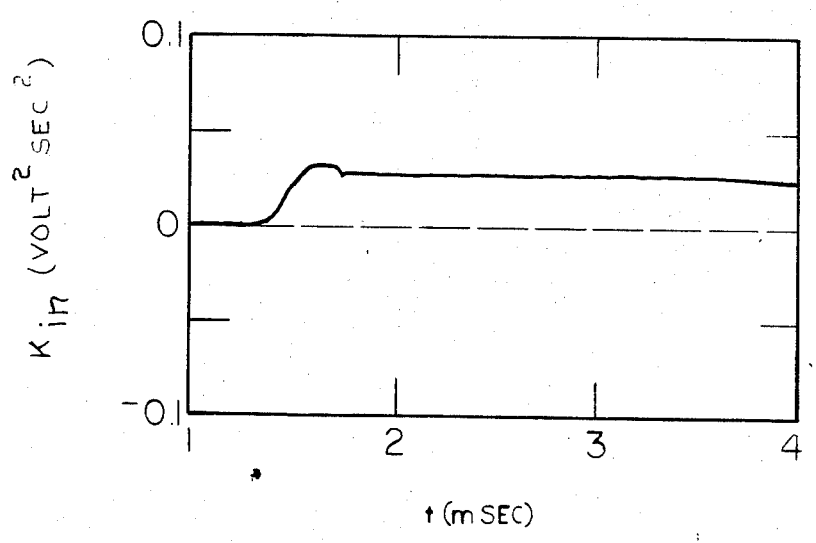

The experimental results from a typical linked discharge in S-1 are shown in FIGS. 2a-c. FIG. 2a shows the time histories of fluxes and voltages for a typical linked spheromak plasma. The fluxes and voltages are obtained from wire loops embedded in the core just beneath the surface. The fact that the poloidal flux does not return to zero indicates that the spheromak plasma is still coupled to the flux core as in FIG. 1. The resulting rate of helicity input from the core $$(\partial k/\partial t)_{in} = 2\psi\dot{\phi} \quad (12)$$

and the resulting helicity are shown in FIG. 2b. Injected helicity reaches a constant value approximately 0.3 msec after the plasma is initiated. The resulting experimentally measured toroidal plasma current and flux are shown in FIG. 2c.

The same discharge is used to represent, or model, the first 0.6 msec of a continuously driven spheromak (FIG. 3). Then $\psi-\phi$ pumping is simulated. The poloidal flux is modulated with $\psi_1/\psi_0 \approx 0.68$ and the toroidal flux with $\phi_1/\phi_0 \approx 0.21$ (FIG. 3a). The resulting peak voltages are on the order of 1 kV and 0.25 kV, respectively. This $\psi-\phi$ pumping may be understood as follows. Toroidal flux is inductively transferred to the plasma during that part of the cycle for which there is a relatively large coupling ($\psi$ large) between plasma and core, so a relatively large amount of helicity is added. Toroidal flux is inductively removed from the plasma during that part of the cycle for which there is a relatively small coupling ($\psi$ small) between plasma and core, so a relatively small amount of helicity is extracted. The input helicity increases nearly linearly in time at a rate of approximately 11.1 volt$^2$sec$^2$ per msec for this case. The helicity doubles from its value before $\psi-\phi$ pumping in approximately 4.5 msec. (No losses are considered in this computation.) There is evidence of relaxation times in S-1 on the order of 50 $\mu$sec. The requirement that the characteristic helicity input time be larger than the relaxation time but comparable or shorter than the diffusion time can easily be satisfied with further optimization and/or hotter plasmas.

CIRCUITRY AND OPERATION TO IMPLEMENT INDUCTIVE FORMATION AND OSCILLATION

The pulsed circuits used to inductively form a spheromak, without subsequent steady-state-drive, are shown in FIG. 6. They are basically RLC (resistance, inductance, capacitance) circuits. The inductances consist mainly of the poloidal ($L_{PF}$) and toroidal ($L_{TF}$) field coils inside the flux core. (The equilibrium field, basically a mirror type field, is produced by coils external to the vacuum vessel and is driven by motor-generators.

This field is steady-state over the lifetime of the pulsed discharge.)

The capacitors in the pulsed circuits are charged before a discharge. These circuits are underdamped and therefore will ring, or oscillate (but too slow for pumping), when switches SW1 and SW2 (ignitron tubes) are closed. Switches SW3 and SW4 are open until now. The poloidal field circuit switch SW1 is closed first in order to establish, with the equilibrium field, the appropriate total vacuum poloidal field. When the current in the PF circuit reaches its maximum (time t=0) SW3 is closed. This creates an increasing toroidal flux in the core. The associated voltage breaks down the neutral gas into a plasma. The toroidal field current increases while the poloidal field current is now decreasing. Each is inducing poloidal and toroidal plasma currents around the flux core. At the appropriate times, switches SW3 and SW4 are closed (crowbarred) to terminate the flux swings and change the circuits into L-R (inductance-resistance) circuits. The currents then decay with associated (L/R) times. FIG. 7 shows the timing for a "linked" spheromak discharge formation.

To achieve the $\psi-\phi$ oscillations for many periods of oscillations, two modifications to the circuits are implemented. First, inductances $L_{CR,PF}$ and $L_{CR,TF}$ are added to the crowbar legs (as shown in FIG. 8) of the poloidal field and toroidal field circuits, respectively. This would enable the circuits to ring, with appropriately high frequency, by themselves upon closure of crowbar switches SW3 and SW4, as in FIG. 9. However, resistive decay would alter both the DC levels after crowbar time and the amplitude of the oscillations superimposed on the DC levels (FIG. 9).

Thus, a second modification should be needed. Additional power may be coupled in through a transformer in series with the poloidal and toroidal field coils as shown in FIG. 10. This system would allow both the oscillations to be superimposed on the currents during the steady-state phase, and also allow maintenance of a true DC level by compensating for the L/R decay of the main circuit.

The secondaries of the transformers are in series with the poloidal and toroidal field coils. The primaries are driven by "oscillator power supplies." Each power supply is an "inverter"—converting stored DC voltage to oscillating voltages and currents. The input power to each inverter can be derived from either high voltage utilities or motor generator (MG) sets, as is shown in FIG. 11.

The SCR shown in FIG. 10 is used to short the primary during the initial current pulses, before steady-state oscillations begin. This serves to reduce the inductance in the circuit, allowing more of the energy to be transferred to the poloidal and toroidal field coils.

The output of the inverter (FIG. 11) can be either a sinusoidal waveform, or a square wave (easier to produce) which is then filtered to let through only the fundamental sinusoidal harmonic. In addition, a slowly rising component may be added to the preceding in order to compensate for the L/R decay in the DC component of the coil currents.

The embodiments of this invention in which an exclusive property or privilege is claimed are defined as follows:

1. A steady-state method of maintaining an inductively formed spheromak plasma comprising the steps of:

(a) inductively producing a spheromak plasma by:

evacuating a vacuum vessel and filling said vessel with a neutral species;

producing a first poloidal magnetic field within said vacuum vessel; producing a second poloidal magnetic field within said vacuum vessel by pulsing a current $I_{pf}$ in a first direction through a poloidal field generating coil, the poloidal field generating coil being located in a toroidally shaped flux core within the vacuum vessel, such that the first and second poloidal magnetic fields are superimposed to form a composite poloidal magnetic field $\psi$ within said vacuum vessel having regions of stronger and weaker strength;

producing a toroidal magnetic field $\Phi$ in said vacuum vessel by passing a current $I_{TF}$ through a toroidal field generating coil which is located in the flux core, thereby initiating a plasma discharge and causing toroidal flux to appear outside of the flux core;

expanding the plasma in the direction of said region of weaker poloidal magnetic field strength;

(b) forming a linked toroidal spheromak plasma from said expanded plasma in which some flux surfaces of said spheromak plasma link both the plasma and the core; and (c) oscillating the poloidal and toroidal magnetic fields $\psi$ and $\Phi$, while said plasma flux surfaces are linked to both the plasma and the core, such that $\psi$ and $\Phi$ have different phases.

2. The method of claim 1 wherein $\psi$ and $\phi$ are oscillated according to the relationship:

$$\psi = \psi_0 + \psi_1 \cos \omega t$$

and $$\phi = \phi_0 + \phi_1 \cos (\omega t + \delta)$$

where $\psi_0$, $\psi_1$, $\phi_0$, $\phi_1$ and $\omega$ are determined by size and strength of the plasma and $\delta$ is the angle of phase shift.

3. The method of claim 2 where $\delta = -\pi/2$.

4. The method of claim 1 wherein said linked spheromak plasma is formed by:

(d) completely pinching off a portion of said expanded plasma from said flux core, said completely pinched off plasma forming a detached toroidal spheromak plasma and;

(e) reconnecting the flux surfaces said spheromak plasma to said flux core such that some magnetic flux links both the plasma and the core such that a linked spheromak plasma is formed.

5. The method of claim 4 wherein step (d) is accomplished by letting $I_{PF} \leq 0$.

6. The method of claim 5 wherein step (e) is accomplished by letting $I_{PF} > 0$, with $I_{TF} = 0$.

7. A quasi-steady-state method of maintaining an inductively formed plasma comprising the steps of:

(a) inductively producing a spheromak plasma by:

evacuating a vacuum vessel and filling said vessel with a neutral species;

producing a first poloidal magnetic field within said vacuum vessel;

producing a second poloidal magnetic field within said vacuum vessel by pulsing a current $I_{PF}$ in a first direction through a poloidal field generating coil being located in a toroidally shaped flux core within the vacuum vessel, such that the first and second poloidal magnetic fields are superimposed to form a composite poloidal magnetic field within said vacuum vessel having regions of stronger and weaker strength;

producing a toroidal magnetic field $\Phi$ in said vacuum vessel by passing a current $I_{TF}$ through a toroidal field generating coil which is located in the flux core, thereby initiating a plasma discharge and causing toroidal flux to appear outside of the flux core;

expanding the plasma in the direction of said region of weaker poloidal magnetic field strength;

completely pinching off a portion of said expanded plasma from said flux core, said completely pinched off plasma portion forming a detached toroidal spheromak plasma, by setting $I_{PF} \leq 0$;

(b) setting $I_{TF} = 0$;

(c) reconnecting the flux surfaces said spheromak plasma to said flux core, such that some magnetic flux links both the plasma and the core, by increasing $I_{PF}$ while $I_{TF} = 0$;

(d) injecting toroidal flux into said reconnected plasma by setting $I_{TF} > 0$; and (e) oscillating $\psi$ and $\Phi$ such that $\psi$ and $\Phi$ have different phases.

8. The method of claim 1 wherein said plasma is pinched off by energizing a set of pinching coils located near the flux core.

9. The method of claim 1 wherein said plasma is pinched off by simultaneously reversing the directions of $I_{PF}$ and $I_{TF}$.

10. The method of claim 1 wherein said linked spheromak plasma is formed by pinching off a portion of said expanded plasma such that some flux surfaces of said spheromak plasma remain connected to the core.

* * * * *